A. Goodhart,
Ring,
No. 78,275.    Patented May 26, 1868.
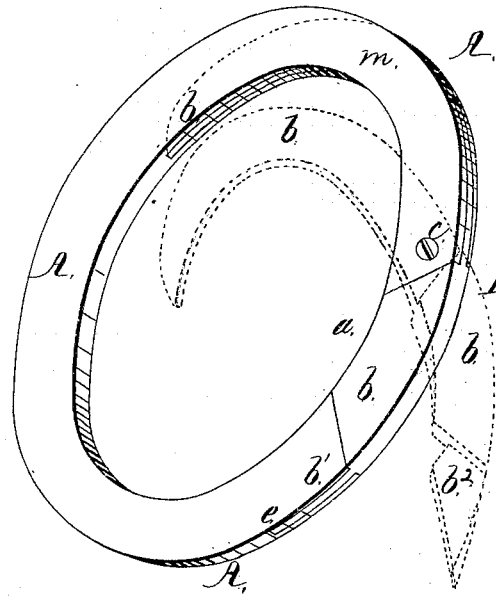
Witnesses:
Chas. A. Pettit.
Thos. G. Took.
Inventor:
Alex Goodhart.
Munn & Co.
Attorneys.

United States Patent Office.

ALEXANDER GOODHART, OF NEWVILLE, PENNSYLVANIA.

Letters-Patent No. 78,275, dated May 26, 1868.

IMPROVED LINK.

The Schedule referred to in these Letters Patent and making part of the same.

TO ALL WHOM IT MAY CONCERN:

Be it known that I, ALEXANDER GOODHART, of Newville, in the county of Cumberland, and State of Pennsylvania, have invented a new and improved Ring; and I do hereby declare that the following is a full, clear, and exact description of the construction and operation of the same, reference being had to the annexed drawing, making a part of this specification, in which—

My invention is represented by a perspective view.

This invention is a neat and substantial ring or link, which can be used in place of a hook for connecting two chains, and when in place will present the appearance of a common link.

I make this link in two parts, hinged together at $c$. One of the parts, shown at A in the drawing, forms one side, both ends, and all but the central portion, $a$, of the other side of the link. The other part, B, consists of a portion, $b$, which fills the space $a$;—a long, curved, and thin shank, $b^1$, by which it is hinged to the part A, and a tenon, $b^2$, which, when the link is in use, fits into a gain or recess, $e$, in the part A, and serves to hold the part B steadily and firmly in place. The shank $b^1$ works in a slot or deep gain in the extremity of the part A, opposite to that in which the recess $e$ is situated.

The shank $b^1$ is made so long that it passes round the end of the link, serving, when the part B is closed against the part A, to support a portion of the strain that the link is subjected to. The part $b$ may be thrown out on its pivot, as seen by the red lines in the drawing, so as to open the space $a$, for the purpose of attaching the links of other chains, or the rings, hooks, or other fastenings that are to be used in connection with this link. When such rings, links, or hooks are introduced, they will immediately bear upon the curved shank $b^1$, drawing it down against the end $m$, closing the part $b$ against the main portion of the ring, and holding all the parts firmly in this position.

The whole device is exceedingly simple, easily operated, not liable to get out of repair, and for many purposes much more convenient than any kind of link or hook that has hitherto been brought into use.

Having thus described my invention, what I claim as new, and desire to secure by Letters Patent, is—

A link formed of the parts A and B, the latter being provided with a curved shank, $b^1$, and a tenon, $b^2$, and operating in connection with the part A, substantially in the manner and for the purpose specified.

ALEX. GOODHART.

Witnesses:
M. WILLIAMS,
SAMUEL PIPER.